(12) United States Patent
Gilles et al.

(10) Patent No.: US 6,206,200 B1
(45) Date of Patent: Mar. 27, 2001

(54) MOUNTING SYSTEM FOR MODULAR PANELS USED IN A SCREEN DECK

(75) Inventors: Stephen R. Gilles, Elberfeld, IN (US); Alan E. Presley, Wytheville, VA (US); Robert E. Moser, Jr., Denver, NC (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/233,565

(22) Filed: Jan. 19, 1999

(51) Int. Cl.$^7$ ........................................................ B07B 1/49
(52) U.S. Cl. ............................ 209/399; 309/400; 309/408
(58) Field of Search ....................... 209/399, 400, 209/403, 404, 405, 408

(56) References Cited

U.S. PATENT DOCUMENTS

| | | | |
|---|---|---|---|
| 3,029,912 | 4/1962 | Barker | 29/520 X |
| 3,042,206 | 7/1962 | Olender | 209/395 |
| 3,483,974 | 12/1969 | Pearsall | 209/273 |
| 3,980,555 | 9/1976 | Freissle | 209/408 |
| 4,141,821 | 2/1979 | Wolff | 209/405 |
| 4,219,412 | 8/1980 | Hassall | 209/399 |
| 4,265,742 | 5/1981 | Bucker et al. | 209/399 |
| 4,347,129 | 8/1982 | Rutherford | 209/399 |
| 4,375,408 | 3/1983 | Anderson | 209/405 |
| 4,383,919 | 5/1983 | Schmidt | 209/399 |
| 4,409,099 | 10/1983 | Wolff | 209/399 |
| 4,661,245 | 4/1987 | Rutherford et al. | 209/399 |
| 4,670,136 | 6/1987 | Schmidt et al. | 209/403 |
| 4,757,664 | 7/1988 | Freissle | 52/509 |
| 4,863,597 | 9/1989 | Gilles et al. | 210/232 |
| 4,871,288 | 10/1989 | Schmidt et al. | 411/45 |
| 4,882,044 | 11/1989 | Freissle | 209/319 |
| 4,909,929 | 3/1990 | Tabor | 209/400 |
| 5,277,319 | 1/1994 | Henry, Jr. | 209/399 |
| 5,361,911 | 11/1994 | Waites, Sr. et al. | 209/399 |

FOREIGN PATENT DOCUMENTS

| | | | |
|---|---|---|---|
| 2749489 | 6/1978 | (DE) . | |
| 3607660 | * 9/1987 | (DE) | 209/399 |
| 4136898 | * 5/1993 | (DE) | 209/399 |
| 167999 | 1/1986 | (EP) . | |
| 2574007 | 12/1984 | (FR) . | |
| 691617 | 5/1953 | (GB) . | |
| 2055421 | 4/1981 | (GB) . | |
| 2262581 | 6/1993 | (GB) . | |

OTHER PUBLICATIONS 1 page flyer published about Jan. 1991 by Bixby Zimmer entitled "Pro–Deck Profile Wire 1' – 4' Panels with Polyurethane Edging".

* cited by examiner

Primary Examiner—Tuan N. Nguyen
(74) Attorney, Agent, or Firm—Barry L. Clark

(57) ABSTRACT

Screen deck assembly 10 has a locking system for retaining a plurality of modular screen panels 20 in such a manner that they can be individually replaced, if desired. The system includes sets of abutting retainer bars 18 which each have half of a generally cylindrical opening 28 which is adapted to receive generally cylindrical sleeve members 30. The sleeve members extend through the retainer bars and also through openings 14 in underlying support frame members 12. Locking pins 32 inserted into the sleeve members expand the lower portions of the sleeve members to lock the retainer bars relative to the support members. Sideways separation of the abutting retainer bars is prevented by downwardly extending continuous annular ring portions 72 on the sleeve members which are seated in complementary semi-circular grooves 61 formed in each of the abutting retainer bars. The sleeve members can be made in a range of sizes with varying outer diameters at their lower ends to accommodate wear or varying dimensions of the openings in the support frame members.

9 Claims, 3 Drawing Sheets

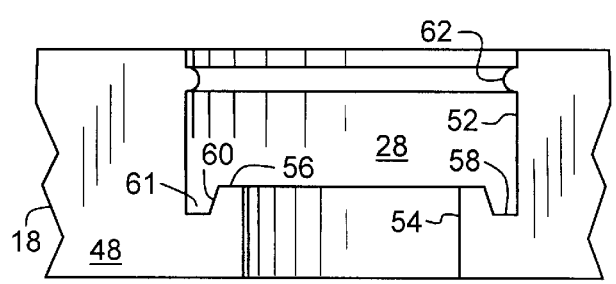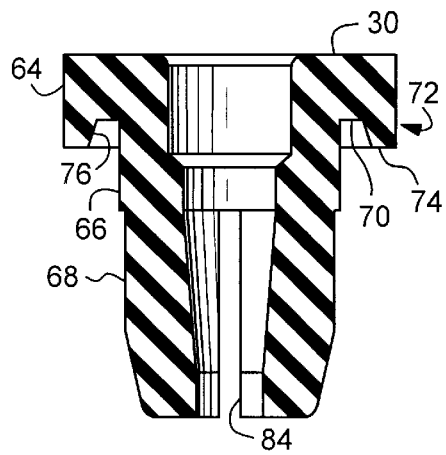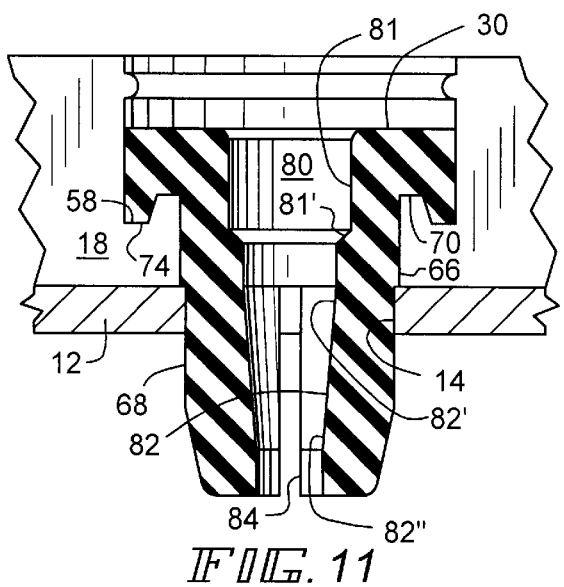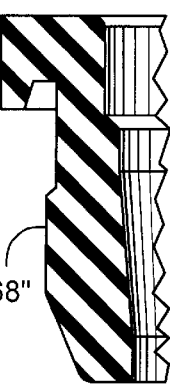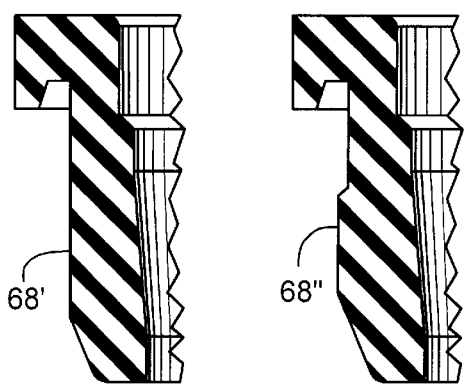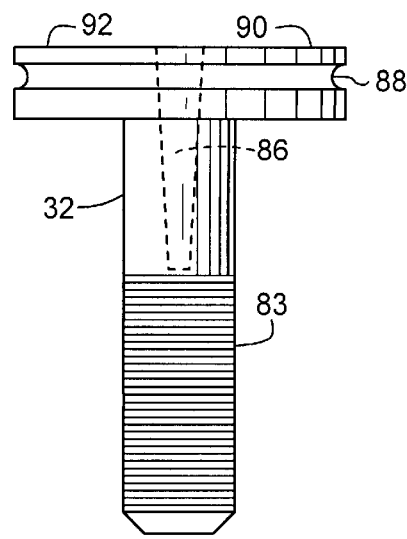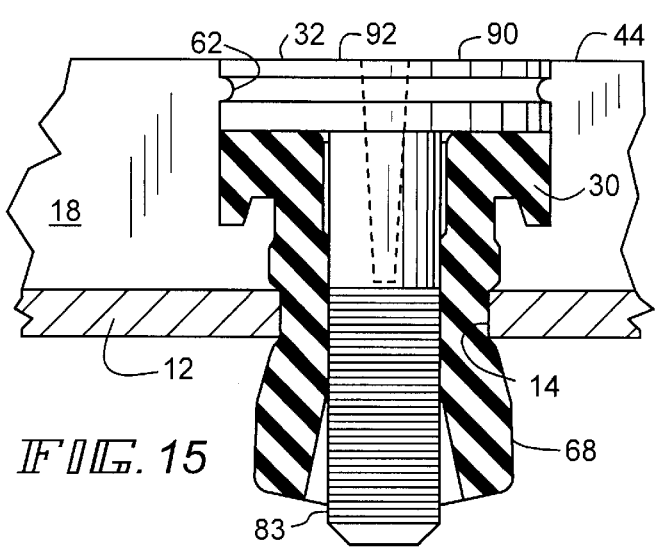

MOUNTING SYSTEM FOR MODULAR PANELS USED IN A SCREEN DECK

BACKGROUND OF THE INVENTION

1) Field of the Invention

The invention relates to modular profiled wire flat screen panels which are adapted to be mounted on a screen deck support assembly to classify materials, and particularly to arrangements for mounting said panels so they can be used in a vibrating apparatus. The screen panels typically comprise a plurality of parallel stainless steel profiled wires which are each welded to an underlying series of spaced apart support rods positioned normal to the wires.

2) Description of the Related Art

A principal use for such panels is in coal processing plants where the smaller particles in the crushed coal which is processed over the screens passes through the slot openings. In many cases the screens will be arranged so that the coal will pass from one screen deck to another, which is either in line with it or under it. By having larger slot openings in the first or upper deck, a greater volume of coal can be processed. This is true since the second deck, which has smaller slot openings, and thus a lower capacity, will only have to contend with processing those particles which have passed through the larger slots of the first deck. Depending upon the hardness and tonnage of the material being processed, the screen decks will have their screen slots gradually enlarged and will start to wear thin from abrasion in a relatively short period of time, sometimes in as little as two weeks or so. Since prior art screen deck systems often require a crew of 2–4 people working many hours to remove the worn screen panels and replace them with new ones, it is obvious that a system which allows panels to be replaced quickly will offer tremendous cost savings, not only in labor but in lost processing time.

One example of a prior art system is that disclosed in Tabor U.S. Pat. No. 4,909,929 wherein a plurality of modular panels are retained by longitudinally extending retainer bars made of a resilient material such as urethane. The retainer bars have somewhat semi-spherical sockets formed in their top and one side surface in such a manner that when two retainer bars are placed side-by-side in abutting relation on top of a support member on the machine, they form a somewhat spherical socket which has an integral tapered bottom portion extending well below the flat bottom surface of the retainer bar. The integral tapered bottom portions are spaced at uniform intervals, such as 10 cm, which correspond to the spacing of a plurality of holes formed in the support members of the screen deck. As a pair of retainer bars are laid side by side on top of the support members, the tapered bottom portions will extend through the holes in the underlying support members. Locking pins may then be driven down into the centers of the sockets. Since the bottom portion of each locking pin is larger in diameter than the inner diameter of a tapered hole formed in the bottom of the tapered bottom portion, the walls of the tapered bottom portion will be forced radially outwardly from the vertical plane where the two retainer bars abut each other. This radially outward movement will cause the distance between the outer walls of the tapered bottom portions, as measured in a vertical plane normal to the plane of abutment, to be greater than the diameter of the holes in the support members. Thus, the retainer bars will be held in contact with the support members and prevented from moving upwardly relative to said support members. Although this design is effective in retaining screen panels, it has been found that a great deal of time must be spent when screen panels are to be replaced. For example, in commercial applications of the design, the upper ends of the locking pins are protected by elongated overlying cover strips which have spaced portions which engage with the retaining ridges formed at the top of each socket. Since the cover strips are very difficult to remove, the standard practice has been to drill through the cover strip at the location of each pin. This can be a very tedious operation, and especially so when multi-layer deck assemblies have one deck located just 60 cm or so below another deck. Since the tapered bottom portions which enter the holes in the support members are integral with the retainer bars, they are not able to accommodate substantial increases in the diameter of the holes in the support members which can take place due to wear over long periods of time. Also, although the holes in the support members tend to engage the outer surfaces of the abutting pairs of tapered bottom portions and hold them together, wear of the holes will allow the abutting walls of the retaining bars to move apart. They can also move apart because they are made of an elastomeric material which will be compressed against the sides of the openings in the support bars as the locking pins are driven into the sockets. Obviously, any separation of the retaining bars will close up the space between sets of retaining bars which is available for the placement of replacement screen panels. This situation usually means that all of the panels must be replaced at once, and arranged in place before the locking pins are placed in any of them, even though only some are worn.

Another prior art system has been sold under the name "Pro-Deck". This system also uses sets of resilient retaining bars which have recesses in one side wall which cooperate with identical recesses on an adjacent bar to provide a plurality of socket-like recesses into which resilient, generally cylindrical sleeves can be placed. The bottom surfaces of the retaining bars are flat and are positioned so as to overlie the support member. The generally cylindrical sleeves are complementary in shape to the aligned recesses in the sets of retaining bars and elongated so they will extend through and beyond the spaced apart holes in the underlying support member. To accommodate wear of the holes in the support member, replacement sleeves can be used in which the lower end portions of the sleeves have larger diameters. The lower end portions of the sleeves have a tapered internal opening and a vertical slot which allows the side walls to expand radially outwardly away from each other as the locking pin is forced downwardly. Since each set of retaining bars is held only against vertical movement by the sleeves and lockpins, it is possible for the abutting side walls of the retaining bars to become slightly spaced from each other, thus presenting the same problem in replacing individual screens as previously described.

SUMMARY OF THE INVENTION

It is among the objects of the present invention to provide a modular screen panel mounting system which allows screen panels to be replaced far more quickly. It is another object to provide a mounting system which can accommodate increases in the hole sizes of underlying members due to wear. It is yet another object to provide a mounting system which will maintain adjacent pairs of screen panel retaining bars in tight abutting relationship. These and other objects are achieved by the mounting system of the present invention wherein pairs of retaining bars, which are preferably molded of an elastomeric material such as urethane, are provided with spaced openings along one side surface for receiving the spaced apart support rods of an elongated screen panel. Typically, the retaining bars are 1.2 m long and have flat bottom and top surfaces and a generally rectangular cross-section. On the side surface opposite the side which receives the screen panel support rods, the abutting retaining bars have aligned recesses which are typically spaced on 10 cm centers. The recesses formed in each of two abutting retainer bars are generally semi-cylindrical in any horizontal plane but cooperate to form generally cylindrical upwardly directed openings into which resilient, generally cylindrical elastomeric sleeve members may be placed. These openings formed by abutting retainer bars include an enlarged diameter upper wall portion and a smaller diameter lower wall portion. These spaced apart upper and lower wall portions overlap each other in a vertical direction. A radially inwardly extending seat portion extends from the bottom edge of said upper wall portion and a radially outwardly extending seat portion extends from the top edge of the inner surface of said lower wall portion. These two seat portions are joined by a conical portion to define a downwardly extending groove portion.

The generally cylindrical elastomeric sleeve members have an axially extending opening in their interior to receive a locking pin. The sleeve members, which are adapted to be lowered into said upwardly directed openings, have complementary enlarged diameter upper portions and smaller diameter intermediate portions which are adapted to engage the aforesaid upper and lower wall portions of the retainer bar. The lower end surface of the enlarged diameter upper portion of each sleeve member, proceeding inwardly, has a radially inwardly extending surface portion which is adapted to be seated on the radially inwardly extending seat portion of the opening in the retainer bar. The lower end surface then tapers upwardly to a point where it proceeds radially inwardly to form a surface which is adapted to be seated on the radially outwardly extending seat portion of the opening in the retaining bar. Thus, the lower end surface of the enlarged diameter upper portion of the sleeve member forms a continuous, downwardly extending annular ring portion which is complementary to the groove formed in the opening of the abutting retaining bars. When the sleeve members are assembled into their seats in the socket like openings in the abutting retainer bars, their downwardly extending ring portions will engage the grooves in the retainer bars and prevent horizontal separation of the retainer bars. The sleeve members also have a lower portion which is adapted to extend through the holes in the support members and beyond. This lower portion includes an axially extending inner wall which is conically tapered downwardly to a smaller diameter than the locking pin, while the outer wall is cylindrical. After a sleeve member has been assembled to the retainer bars and an opening in an underlying support member, the insertion of a constant diameter locking pin into the tapering hole will apply a radially outward force to the elastomeric material of the lower wall portion of the sleeve. This outward force will cause portions of the outer surfaces of the lower wall portion of the sleeves to move outwardly to a degree that they will be spaced from each other by a dimension greater than the diameter of the holes in the support members. Thus, vertical movement between the retaining bars and support members will be prevented. To further assist the retention of the locking pin, its top surface has a groove in its side wall that is engaged by an inwardly extending ridge formed in the inner surface of the sleeve member. The locking pin is preferably formed with a tapered internal opening extending downwardly from its top surface. When it is desired to remove an assembled locking pin, a tool with a tapered thread on its lower end can be inserted into the tapered opening and rotated sufficiently to engage the material of the pin. A wedge member can then be placed under an upper flat surface on the tool and a sideways force applied to the wedge to lift the tool and the lock pin with which it is engaged.

BRIEF DESCRIPTION OF THE SEVERAL VIEWS OF THE DRAWINGS

FIG. 9 is an enlarged view of a portion of the side of the retainer bar shown in FIG. 5, illustrating the detail of one of the sleeve receiving openings;

FIG. 10 is a cross-sectional view of a sleeve member which is adapted to be received in the opening of FIG. 9;

FIG. 11 is a side view illustrating the assembly of the sleeve of FIG. 10 in the sleeve receiving opening shown in FIG. 9;

FIG. 12 is a fragmentary view similar to FIG. 10 showing a modified shape of the sleeve in which the lower outer wall of the sleeve is provided with a diameter slightly larger than that shown in FIG. 10;

FIG. 13 is a fragmentary view similar to FIGS. 10 and 11 showing a further modified shape of the sleeve in which the lower outer wall of the sleeve is provided with a diameter slightly larger than that shown in either FIGS. 10 or 11;

FIG. 14 is a side view of a generally cylindrical locking pin which is adapted to be driven into the sleeve member shown in FIG. 11; and FIG. 15 is a side view showing the retainer bar and sleeve assembly of FIG. 11 in contact with an opening in a screen deck support bar, and illustrating how opposed outer wall portions of the sleeve member are forced away from each other by the insertion of the locking pin.

DETAILED DESCRIPTION OF THE INVENTION

Figure 1:
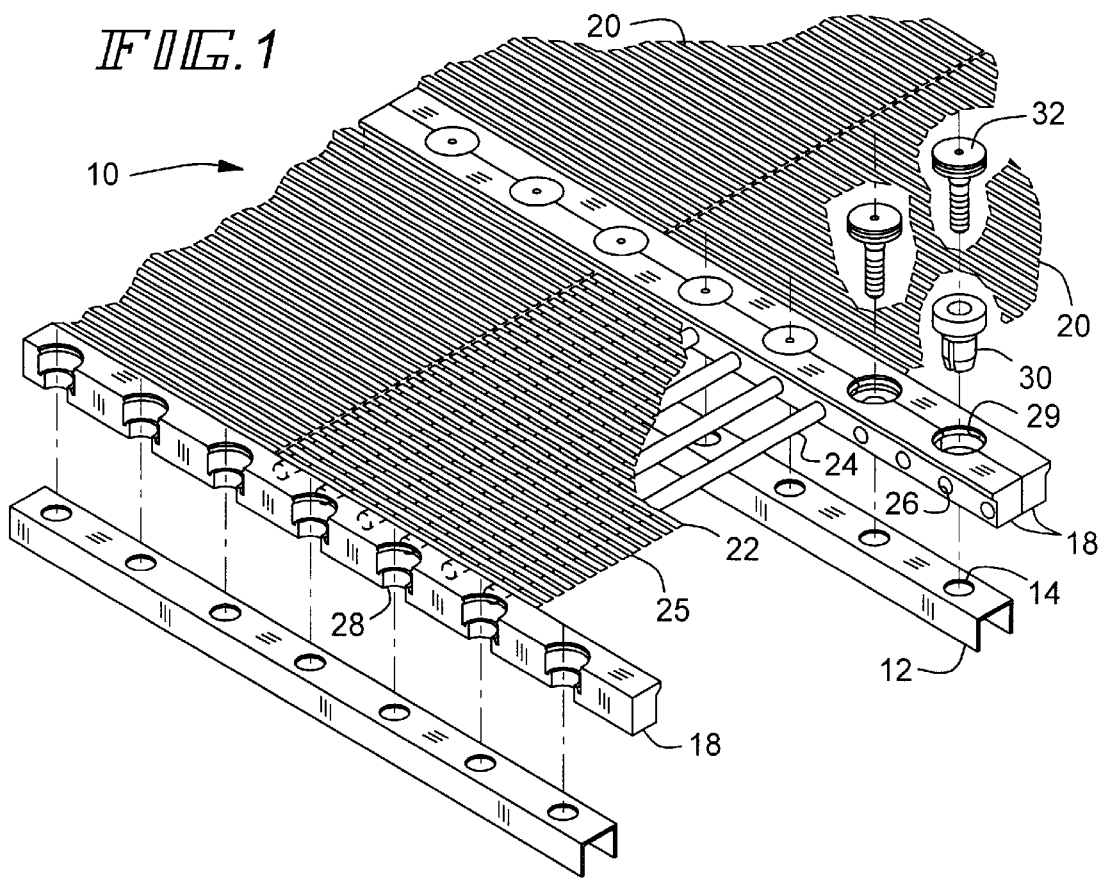
FIG. 1 is an exploded, partially broken away isometric view illustrating the relationship between the frame support members of a screen deck, the resilient retainer bars, the modular screen panels, the expandable locking sleeves and the locking pins.

FIG. 1 illustrates the various parts of the screen deck mounting system in an exploded relationship as an assembly indicated generally at 10. The assembly has as its base, the support members 12 which are shown to be channels but could be of various other suitable shapes that have sufficient strength, such as angle members. The upper surface of the support members 12 includes a plurality of circular openings 14 which are arranged in an evenly spaced pattern such as every 10 cm. The support members 12 underlie and support retainer bars 18 which are formed of an elastomeric material such as polyurethane which is preferably formed in 1.2 m lengths. The retainer bars are arranged in pairs in abutting side-by-side relation and provide the support for a plurality of screen panel modules 20 which typically have a width of 30 cm and lengths from 3–122 cm. Usually, the screen panel modules, which are preferably made of stainless steel, are combined so as to form a screen deck that is from 1.84–2.44 m wide and 4.9 m or more in length. Each screen panel module 20 has an upper surface comprising spaced apart profile wires 22 which are welded to underlying screen rods 24 to form a plurality of screen slots 25. Whereas wires 22 are closely spaced at distances such as 0.5–1.5 mm, the much heavier support rods 24 are typically spaced at much greater distances, such as 5 cm. The retainer bars 18 have openings 26 formed in one of their side edges which are normally arranged at the same 5 cm spacing as the support rods 24. The openings 26 are adapted to receive the ends of the support rods 24 and provide the sole support for the panel members 20. The top, bottom and opposite side surfaces of the retainer bars 18 include sleeve and locking pin receiving openings 28. When two retaining bars are in complementary abutting relationship, the aligned openings 28 in each of them cooperate to form sockets 29 for receiving elastomeric sleeve members 30. In a manner to be hereinafter described, locking pins 32, inserted into the sleeve members 30 which are positioned in the sockets 29, cause the abutting pairs of retainer bars 18 to be locked to each other while also locking the retainer bars against vertical movement relative to the support members 12. The side edges of the assembly are not shown but would each comprise a single retainer bar 18 whose side openings 26 engage and support the support rod portions 24 of an abutting panel member 20. These edge positioned single retainer bars 18 would normally not be held to an underlying support member on the machine frame by sleeves 30 and locking pins 32. Rather, a side clamping assembly (not shown) would press down on the top of these retainer bars.

Figure 2:
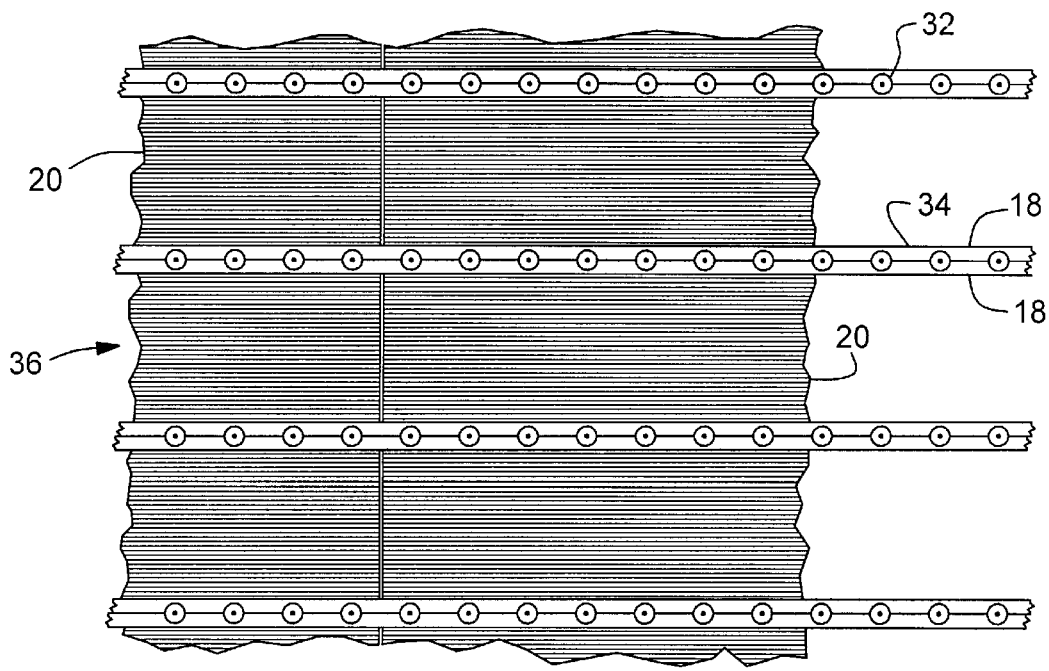
FIG. 2 is a partially broken away top plan view illustrating the relationship of a plurality of sets of retainer bars to the modular screen panels positioned between them.

FIG. 2 illustrates how a number of screen panels 20 are positioned side by side and held in locked relation relative to each other by locking pins 32. The locking pins 32 are forced into spaced openings 28 formed in the abutting parallel sets 34 of retaining bars 18. The retaining bars extend longitudinally of the screen deck and the flow of material over the deck indicated by the arrow 36 is in the same longitudinal direction and in the direction of screen wires 22.

Figure 3:
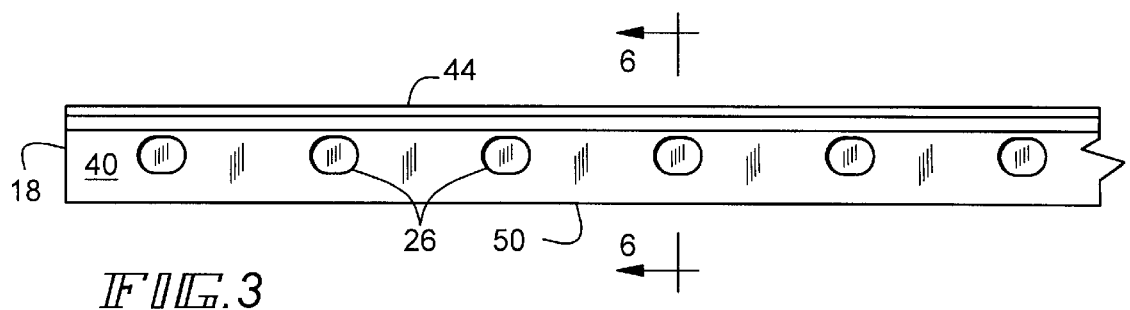
FIG. 3 is a side view of a retainer bar showing the elongated openings which receive the support rods of a modular screen panel.

FIG. 3 shows openings 26 which are formed in one side surface 40 of the retainer bars 18. The openings 26 are preferably wider than they are high to facilitate the assembly of screen rods 24 and are typically spaced at the same distance apart as the screen rods 24, normally 5 cm.

Figure 4:
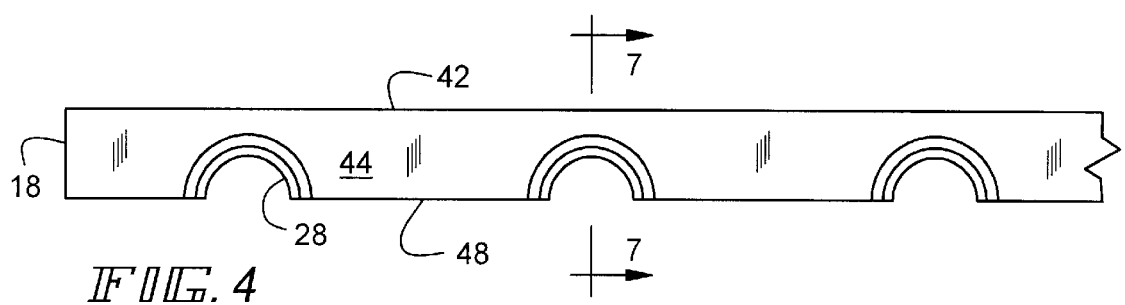
FIG. 4 is a top view plan view of a retainer bar showing the openings which are adapted to receive expandable locking sleeves when a pair of retainer bars are positioned adjacent to each other.

FIG. 4 is a top plan view of a retainer bar 18 and shows sleeve and pin receiving openings 28 which have a semi-circular cross-section. The openings 28 are molded into the top retainer bar surface 44 and the side surface 48 and are typically spaced at the same distance apart as the openings 14 in the screen deck support channels, normally 10 cm.

Figure 5:
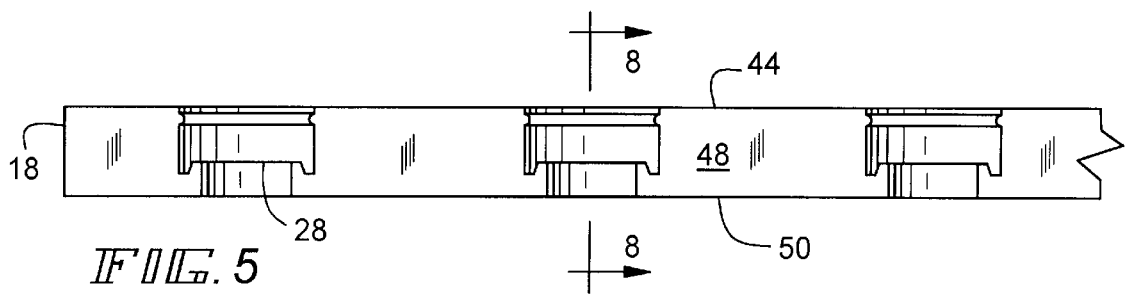
FIG. 5 is a view of the side of the retainer bar which is opposite to that shown in FIG. 3.

FIG. 5 is a side view of a retainer bar 18 showing several evenly spaced sleeve and pin receiving openings 28 molded into its side surface 48, its top surface 44 and its bottom surface 50.

Figure 6:
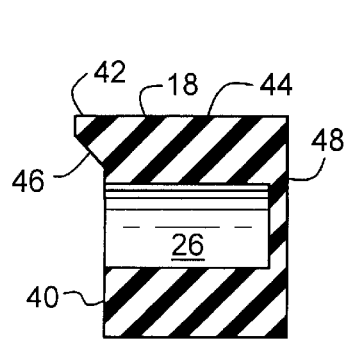
FIG. 6 is an enlarged cross-sectional view taken on line 6—6 in FIG. 3.

FIG. 6 is a cross-section of the retainer bar 18 taken on line 6—6 of FIG. 3. The cross-section shows one of the openings 26 which provides support for a screen rod 24. The upper corner edge portion 42 of the retainer bar 18 extends outwardly from side wall 40 in the plane of top wall 44 and has an angled portion 46. The angled portion 46 is preferably formed at an angle of about 45° and serves to overlie and provide a sealing relationship with the screen wire 22 (not shown) which is closest to the edge of a panel 20 whose screen rod 24 is mounted in opening 14.

Figure 7:
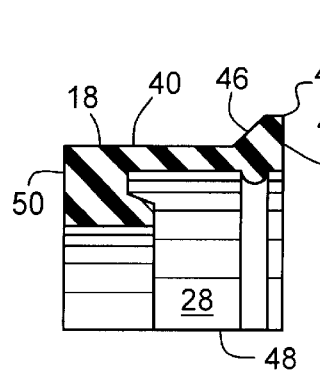
FIG. 7 is an enlarged cross-sectional view taken on line 7—7 in FIG. 4.

FIG. 7 is a cross-section of the retainer bar 18 taken on line 7—7 of FIG. 4. The cross-section illustrates the internal shape of the opening 28 which is molded into the top surface 44, the bottom surface 50 and the side wall surface 48 of the retainer bar 18. The purpose of the special internal shape is described in detail with reference to FIG. 9.

Figure 8:
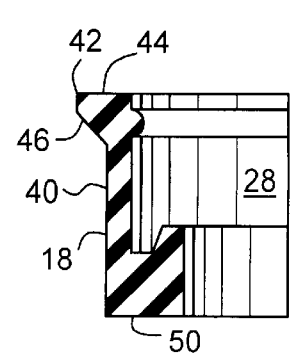
FIG. 8 is an enlarged cross-sectional view taken on line 8—8 in FIG. 5.

FIG. 8 is a cross-section of the retainer bar 18 taken on line 5—5 of FIG. 5 showing the opening 28 and is described in more detail with reference to FIG. 9.

FIG. 9 is an enlarged view of the side portion 48 of the retainer bar 18 shown in FIG. 5. and the opening 28 which is formed therein. The opening 28 is generally semi-cylindrical in shape and includes an upper enlarged diameter wall portion 52, a lower reduced diameter wall portion 54 and a horizontal sleeve seating portion 56 which extends radially outwardly from the reduced diameter wall portion 54. A horizontal portion 58 extends radially inwardly from the upper enlarged diameter wall portion 52 and is joined to the sleeve seating portion 56 by an angled wall portion 60 to form a groove 61. The upper enlarged diameter portion 52 includes an inwardly extending ridge portion 62.

FIG. 10 is a cross-sectional view of the generally cylindrical sleeve member 30, which is preferably formed of a urethane material of a durometer which is less that that used for the retainer bars 18 and locking pins 32. Preferably, the sleeve members 30 are of a material having a durometer of about 80 A±10 while the retainer bars 18 preferably have a durometer of 90 A±10. The locking pins 32 preferably have a durometer of 55 D or harder. The sleeve member 30 has an outer generally cylindrical shape which is complementary to the inner shape of the opening 28 shown in FIG. 9. The sleeve member 30 includes an upper enlarged diameter outer wall portion 64, an intermediate reduced diameter outer wall portion 66 and a lower wall portion 68. The lower wall portion 68 is shown in FIG. 10 as being of a lesser diameter than wall portion 66, but it could also be of the same diameter as shown at 68' in FIG. 12 or a larger diameter 68" as shown in FIG. 13, for reasons that will be described in connection with FIG. 15. The sleeve member 30 includes a horizontal seating surface 70 which is adapted to be seated on surface 56 of the retainer bar 18 when a pair of retainer bars are placed in abutting relationship with their semi-cylindrical openings aligned with each other to form cylindrical openings or sockets 29. An annular ring portion indicated generally at 72 comprises the lower portion of wall portion 64, the lower horizontal portion 74, and an angled inner wall portion 76. When the sleeve member 30 is assembled to a pair of retainer bars 18, as shown in FIG. 11, the horizontal portion 74 is seated on the horizontal seat portion 58 of the groove 61 and the angled inner wall portion 76 engages the angled wall portion 60. Since the ring portion 72 of the sleeve is annular and continuous, it will cause the abutting retainer bars 18 to be firmly held in contact with each other.

FIG. 11 shows the sleeve member 30 of FIG. 10 inserted in the opening 28 of the retainer bar 18 shown in FIG. 9. It also shows the lower outer wall portion 68 of the sleeve member passing through an opening 14 in the support channel 12. The interior of the sleeve member 30 has an internal opening 80 extending along its axis which is adapted to receive the locking pin member 32 shown in FIG. 14. The opening 80 has an enlarged diameter entrance portion 81 joined by a chamfered portion 81' to a wall portion 82. The wall portion 82 preferably has a slot 84 intersecting opposed portions of its circumference. The wall portion 82 is conically tapered from a diameter 82' at its upper end which is just slightly smaller than the diameter of the grooved shaft portion 83 of the locking pin 32 to a diameter at its lower end 82" that is considerably smaller. Thus, as the locking pin 32 is driven into the sleeve 30 it will force the resilient material of the sleeve, which is more resilient and less rigid than the pin 32, to move outwardly on opposite sides of the slot 84 and assume a shape such as shown in FIG. 15. As can be seen in FIG. 15, the opposite sides of the lower wall portions 68 are moved to a distance apart which is much greater that the diameter of the opening 14 in the support channel 12. This sideways movement will prevent upward movement of the sleeve 30 and thus cause the sets of retainer bars 18 to be held in firm contact with the support channel. Although the sleeve 30 is shown as having a single slot 84 passing through opposed sides of its lower wall portion 68, it would also be possible to have additional slots or no slots. The use of additional slots would provide more uniform retaining forces around the locking pin 32. Where there are no vertical slots and the lower wall portion 68 is circumferentially continuous, the resilient material of the lower wall portion will expand outwardly in a uniform manner and assume a generally bulbous shape of a diameter greater than that of the hole 14. However, when there are no slots in the lower wall portion it is preferred that the sleeve be made of a material having a lower durometer, such as 75 A±10. Some typical dimensions are 1.29 cm for the grooved pin portion 83, 1.42 cm for upper enlarged diameter portion 81, 1.07 cm for upper diameter portion 82' and 7.5 mm for lower diameter portion 82".

As can be seen in FIGS. 14 and 15, the locking pin 32 has a tapered opening 86 formed in its interior. When it is necessary to remove the locking pins 32, such as when the screen panels 20 are to be replaced, the tapered openings 96 may be engaged by a suitable tool (not shown), such as a wood screw which extends downwardly from a T-grip handle. Once the locking pin is firmly engaged by the removal tool, a wedge member can be forced into the space between the T-grip handle and a portion of the top surface of the retainer bar 18 adjacent to the top of the locking pin to lift the locking pin upwardly out of the sleeve member 30. Grooves 88 formed in the sides of the top portions 90 of the locking pins 32 are shaped to be complementary to the ridges 62 of the retainer bars. Since the retainer bars 18 are of lower durometer than the pins 32, the ridges 62 get compressed as the pins are assembled. After assembly, the top surfaces 92 of the pins 32 will be flush with the top surface 44 or the retainer bars. This situation makes it possible to visually observe that all pins have been properly assembled.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A locking system for holding and permitting rapid replacement of a plurality of modular screen panels relative to a plurality of uniformly spaced holes in a plurality of longitudinally extending support members carried by a screen deck; said screen panels having transversely extending support rods and longitudinally extending wires on their upper surface which are welded to said transversely extending support rods; at least one set of two, elongated, longitudinally extending retaining members made of elastomeric wear resistant material; each of said retaining members having a flat bottom surface which is adapted to overlie and be supported by at least a portion of the width of one of said support members; each of said retaining members having a plurality of openings in one side edge which are adapted to receive the transversely extending support rod portions of said screen panels; each of said retaining members further having a plurality of vertically extending openings in a second side edge which extend from their upper surface to their bottom surface and are uniformly spaced to correspond to a plurality of openings formed in said plurality of longitudinally extending support members; said plurality of vertically extending openings in said retaining members comprising recesses formed in said retaining members which are complementary in shape to a plurality of elastomeric sleeve members which are adapted to be assembled thereto; said recesses formed in said retaining members having retaining portions cooperating with retaining portions formed in the outer surface of said sleeve members when said sleeve members are assembled to said retaining members to cause said retaining members to be locked to said sleeve members against radial movement; relative to the axis of the sleeve member said elastomeric sleeve members each having a vertically extending central opening extending downwardly from its upper surface; each of said sleeve members further having a lower end portion; the lower end portions of said sleeve members being of sufficient length that they will pass completely through and beyond the said plurality of uniformly spaced holes formed in said plurality of longitudinally extending support members carried by a screen deck when the sleeve members are assembled into the vertically extending openings in said at least one set of two retaining members while said at least one set of two retaining members are overlying said support members and are arranged so that their vertically extending openings in their second side edges are aligned and abutting each other; and a plurality of locking pins which are adapted to be pressed into the upper ends of the openings in said sleeve members; said locking pins having an outer diameter at their lower ends which is greater than the internal diameter of the openings in the lower ends of said sleeve members, whereby the downward insertion of said pins in said sleeve members will cause opposed portions of the outer wall of said sleeve members to be forced radially outwardly away from each other to a dimension which is greater than the diameter of the holes in said support members, thereby preventing upward movement of said sleeves through said holes in said support members and causing the retaining members and support members to be firmly locked to each other.

2. A locking system according to claim 1 wherein the recesses formed in said retaining members which are complementary in shape to a plurality of elastomeric sleeve members which are adapted to be assembled thereto include a retaining portion comprising a semi-circular, downwardly extending groove portion formed in each retaining bar which is complementary to one half of a continuous ring shaped retaining portion formed on each sleeve member, whereby, when a pair of retaining bars are in adjacent contacting relationship, said continuous ring shaped retaining portion on said sleeve member will be seated in the semi-circular, downwardly extending groove portion formed in each of said pair of retainer bars and will firmly hold said two bars together and resist their separation.

3. A locking system according to claim 2 wherein the recesses formed in said retaining members include an upper generally vertical outer wall portion, a lower generally vertical inner wall portion and an intermediate portion joining the outer wall portion to the inner wall portion, said outer wall portion and said inner wall portion overlapping each other in a vertical direction with the inner diameter of the upper wall portion being substantially larger than the inner diameter of the lower wall portion, said intermediate portion comprising a lower radially extending portion extending inwardly from said outer wall portion, an upper radially extending portion extending outwardly from said inner wall portion and an upwardly and inwardly extending angled portion joining said lower radially extending portion to said upper radially extending portion.

4. A locking system according to claim 1 wherein each of said retainer bars includes a radially inwardly projecting ridge portion formed just below its upper surface in each of said plurality of vertically extending openings and in a location which is above the location of the upper surface of a sleeve member which is adapted to be inserted in said vertically extending openings.

5. A locking system according to claim 1 wherein each of said locking pins has an elongated hollow, axially extending opening formed in its upper end which is adapted to be engaged by a pin removal tool.

6. A locking system according to claim 1 wherein said opposed portions of the outer wall of said sleeve member are radially spaced from each other by a vertical slot extending upwardly from the lower end surface of said sleeve member.

7. A locking system according to claim 1 wherein the elastomeric sleeve members have a durometer which is less than that of the locking pins.

8. A locking system according to claim 1 wherein the elastomeric sleeve members have a durometer which is less than that of the retaining members.

9. A locking system according to claim 1 wherein the retaining members and sleeve members are made of urethane and have durometers of 90 A±10 and 80 A±10, respectively.

* * * * *